United States Patent
Schade et al.

(10) Patent No.: US 9,481,742 B2
(45) Date of Patent: Nov. 1, 2016

(54) CONTINUOUS PROCESS FOR THE MANUFACTURE OF HIGHLY-BRANCHED POLYMERS

(71) Applicant: BASF SE, Ludwigshafen (DE)

(72) Inventors: Christian Schade, Ludwigshafen (DE); Faissal-Ali El-Toufaili, Ludwigshafen (DE); Aaron Flores-Figueroa, Mannheim (DE); Gledison Fonseca, Mannheim (DE); Michaela Heußler, Haßloch (DE); Christian Schwede, Weinheim (DE); Helmut Witteler, Wachenheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/784,305

(22) PCT Filed: Apr. 7, 2014

(86) PCT No.: PCT/EP2014/056891
§ 371 (c)(1),
(2) Date: Oct. 14, 2015

(87) PCT Pub. No.: WO2014/170149
PCT Pub. Date: Oct. 23, 2014

(65) Prior Publication Data
US 2016/0075801 A1    Mar. 17, 2016

(30) Foreign Application Priority Data
Apr. 16, 2013 (DE) .................................... 13163900

(51) Int. Cl.
*C08F 2/00* (2006.01)
*C08F 20/06* (2006.01)
(Continued)

(52) U.S. Cl.
CPC ............ *C08F 20/06* (2013.01); *B01J 19/0093* (2013.01); *C08F 2/01* (2013.01); *C08F 2/10* (2013.01); *C08F 2/16* (2013.01); *C08F 20/00* (2013.01); *C08F 120/06* (2013.01); *C08F 120/14* (2013.01)

(58) Field of Classification Search
CPC ....... B01J 19/0093; C08F 20/00; C08F 2/01; C08F 2/10; C08F 2/16; C08F 20/06; C08F 120/06; C08F 120/14
USPC ................................................ 526/64, 317.1
See application file for complete search history.

(56) References Cited

U.S. PATENT DOCUMENTS 6,555,629 B1    4/2003    Pysall et al.
9,056,926 B2    6/2015    Kleiner et al.
(Continued)

FOREIGN PATENT DOCUMENTS

DE    19816886 A1    10/1999
EP    1067352 A1    1/2001
(Continued)

OTHER PUBLICATIONS

Extended European Search Report for European Application No. 13163900.7 mailed Oct. 8, 2013.
(Continued)

*Primary Examiner* — William Cheung
(74) *Attorney, Agent, or Firm* — Drinker Biddle & Reath LLP (57) ABSTRACT

The present invention relates to a continuous process for the manufacture of highly-branched homo- or copolymers of $C_3$-$C_8$ ethylenically unsaturated mono- or dicarboxylic acid as well as the anhydrides and salts thereof (monomer A) by means of free-radical polymerization of monomer A and optionally water-soluble, monethylenically unsaturated comonomers (monomer B) in an aqueous medium in the presence of at least one water-soluble initiator, wherein the polymerization takes place in at least one tubular reactor segment.

17 Claims, 1 Drawing Sheet

(51) Int. Cl.
*B01J 19/00* (2006.01)
*C08F 20/00* (2006.01)
*C08F 2/01* (2006.01)
*C08F 2/10* (2006.01)
*C08F 2/16* (2006.01)
*C08F 120/06* (2006.01)
*C08F 120/14* (2006.01)

(56) References Cited

U.S. PATENT DOCUMENTS

| | | |
|---|---|---|
| 9,108,172 B2 | 8/2015 | Mattmann et al. |
| 2008/0106968 A1 | 5/2008 | Schanz et al. |
| 2013/0123427 A1* | 5/2013 | Luettgen .............. C08F 2/00 525/57 |

FOREIGN PATENT DOCUMENTS

| | | |
|---|---|---|
| EP | 2570180 A1 | 3/2013 |
| WO | WO-9726294 A1 | 7/1997 |
| WO | WO-2005/018786 A1 | 3/2005 |
| WO | WO-2009133186 A1 | 11/2009 |
| WO | WO-2011054789 A1 | 5/2011 |

OTHER PUBLICATIONS

International Search Report for PCT/EP2014/056891 mailed Jul. 11, 2014.

Mori, H., et al., "Synthesis and Characterization of Branched Polyelectrolytes. 1. Preparation of Hyperbranched Poly(acrylic acid) via Self-Condensing Atom Transfer Radical Copolymerization", Macromolecules, vol. 35, (2002), pp. 9270-9281.

U.S. Appl. No. 61/497,120, BASF SE.
U.S. Appl. No. 61/521,782, BASF SE.
U.S. Appl. No. 61/696,232, BASF SE.
U.S. Appl. No. 61/521,775, BASF SE.

* cited by examiner

Fig. 1

Milli reactor
(Plug-flow reactor)

Fig. 2

Milli Loop Reactor
(CSTR characteristic)

Fig. 3

Combined configurations
(e.g. CSTR-characteristic
with downstream tubular reactor)

CONTINUOUS PROCESS FOR THE MANUFACTURE OF HIGHLY-BRANCHED POLYMERS

CROSS-REFERENCE TO RELATED APPLICATIONS

This application is a national stage application (under 35 U.S.C. §371) of PCT/EP2014/056891, filed Apr. 7, 2014, which claims benefit of European Application No. 13163900.7, filed Apr. 16, 2013, both applications are incorporated herein by reference in their entirety.

The present invention relates to a continuous process for the manufacture of highly-branched homo- or copolymers of $C_3$-$C_8$ ethylenically unsaturated mono- or dicarboxylic acid as well as the anhydrides and salts thereof (monomer A) by means of free-radical polymerization of monomer A and optionally water-soluble, monethylenically unsaturated comonomers (monomer B) in an aqueous medium in the presence of at least one water-soluble initiator, wherein the polymerization takes place in at least one tubular reactor segment.

BACKGROUND OF THE INVENTION

Processes for the preparation of highly-branched polymers based on $C_3$-$C_8$ ethylenically unsaturated mono- or dicarboxylic acid are limited by their process parameters. Heat removal represents a considerable security and process control aspect, that strongly influences product properties. Another issue is that the manufacture of highly-branched polymers based on $C_3$-$C_8$ ethylenically unsaturated mono- or dicarboxylic acid at higher temperatures leads to a corrosion of the reaction tank and needs instruments that can withstand high pressures correlated to these high temperatures. For this reason longer reaction times are required, usually several hours. Therefore polymers obtained in semi-batch processes, which are characterized by limited process parameters, are restricted in their structural variations.

In order to obtain highly branched polymers based on $C_3$-$C_8$ ethylenically unsaturated mono- or dicarboxylic acids several additives and/or additional steps are usually applied. H. Mori et al. in Macromolecules 2002, 35, 9270-9281, describe the synthesis of highly branched polyacrylic acid via ATRP polymerization of tert-butyl acrylate and a brominated monomer followed by hydrolysis. These processes include expensive and potentially hazardous chemicals and complex procedures.

A way to control the molecular weight is to prepare the polymers by means of controlled radical polymerization in the presence of a chain transfer agent. For lower molar masses very high concentrations of the chain transfer agent are necessary, often in the range >10 weight %. The obtained polymers comprise then an undesired proportion of organic or inorganic components which are noticeable by an intense odour or colour or are undesired from a material point of view, for example because they are toxic or harmful to health, or else because they are disruptive in the intended application.

WO 2009/133186 A1 reads on a continuous process for the preparation of a polymer by free-radical polymerization in the presence of a chain transfer agent wherein the polymerization preferably takes place in a microstructured reaction zone. The polymerization of ethylenically unsaturated carboxylic acids such as acrylic acid is described and may be carried out at a temperature up to 200° C., preferably 60° C. to 110° C.

WO 2011/054789 A1 relates to a process for producing aqueous solutions of homo- or copolymers of acrylic acid in the presence of at least one water-soluble chain transfer agent at a temperature of up to 200° C., preferably 80° C. to 120° C. The low-molecular side-products resulting from the polymerization are later on eliminated by means of physical or physico-chemical separating methods.

Loiseau et al. in Macromolecules, 2003, 36, 3066-3077 describes the synthesis of polyacrylic acid through controlled radical polymerization. The synthesis of polyacrylic acid was carried out in a semi-batch process in the presence of a reversible addition-fragmentation chain transfer (RAFT) agent. The polymer thus obtained displayed a molecular weight dispersity index lower than 2 and a degree of branching lower than 2 mol %.

Couvreur et al. discloses in Macromolecules, 2003, 36, 8260-8267 a semi-batch process for the polymerisation of acrylic acid in the presence of nitroxide. Polyacrylic acid with a narrow molecular weight dispersity index and a degree of branching up to 6.5 mol % were synthesized.

SUMMARY OF THE INVENTION

It was thus an object of the present invention to provide a continuous process which would enable the manufacture of highly-branched polymers based on $C_3$-$C_8$ ethylenically unsaturated mono- or dicarboxylic acids as well as the anhydrides and salts thereof at a high temperature, without the presence of a chain transfer agent and without encountering the drawbacks of undesired organic functionalities within the polymer chain, corrosion of the reaction tank and long polymerisation time.

DETAILED DESCRIPTION OF THE INVENTION

It has now been discovered that such challenges can be met by a continuous process for the manufacture of homo- or copolymers of $C_3$-$C_8$ monoethylenically unsaturated mono- or dicarboxylic acid or of the anhydrides and salts thereof (monomer A) by means of free-radical polymerization of monomer A and optionally water-soluble, ethylenically unsaturated monomers (monomer B) in an aqueous medium in the presence of at least one water-soluble initiator, characterised in that the process comprises at least the following steps:

i) optionally, continuously metering the monomer(s) solution and the initiator solution into a mixing unit comprising at least one micro-mixer and mixing the reactants in the mixing unit, preferably at a temperature of from −15 to 300° C., ii) conducting continuous free-radical polymerization in at least one tubular reactor segment at a temperature of from 180° C. to 300° C., wherein the tubular reactor has a specific surface area larger than 50 m2/m3 and wherein the entire reactor system contains at least one pressure regulating device.

In a preferred embodiment, the polymerization is conducted in the absence of common chain transfer agents.

In a preferred embodiment, the ratio of the length of at least one tubular reactor segment in the direction of the flow of the stream to the diameter is from 1000:1 to 10:1.

Preferably, the polymerisation is carried out at a temperature of 200° C. to 260° C., even more preferably at a temperature of 210° C. to 240° C.

Preferably, the free-radical polymerization is carried out in at least two tubular reactor segments connected in series. The first tubular reactor segment has a first feed side and a first outlet side and is connected to the second tubular reactor segment via the first outlet side that corresponds to the second feed side of the second tubular segment. At least one recycle stream is removed from the outlet side of at least one tubular reactor segment and recycled to the inlet side of one of the tubular reactor segments. The ratio of the recycle stream to the feed stream is between 1 and 1000.

In a preferred embodiment, at least one tubular reactor segment is filled with milli-structured filling.

The viscosity of the highly-branched polymers thus obtained is less dependent on the molecular weight of the polymers and on the pH-value of the solution containing the polymer. Low viscosities can be obtained even when the polymer has a high molecular weight.

Apparatus Used

According to the invention, free-radical polymerization is conducted by means of a continuous process. In a first embodiment of this process, the starting materials used are first mixed continuously with one another in process step i) and then polymerized continuously in process step ii). In a second embodiment of this process, the starting materials are fed directly to the polymerization zone ii) providing the reaction zone consists of at least one mixing zone. In a preferred set-up of this embodiment, the reaction zone ii) consists of a backmixing reactor, e. g. a loop reactor.

For the mixing and polymerization, at least one mixer with microstructures and at least one reactor with milli-structures are preferably used here in each case.

Apparatus with microstructures and/or milli-structures differs from conventional apparatus by the characteristic dimension thereof. The characteristic dimension of a flow device, for example of a mixer or of a reactor, is understood in the context of the present invention to mean the smallest extent at right angles to the flow direction. The characteristic dimension of microapparatus is significantly smaller than that of conventional apparatus. It may especially be in the micrometer to millimeter range. Compared to conventional reactors, microapparatus therefore exhibits significantly different behavior in relation to the heat and mass transfer processes which proceed. By virtue of the greater ratio of surface area to reactor volume, for example, very good heat supply and removal are enabled, and it is therefore also possible to perform highly endo- or exothermic reactions virtually isothermally.

Mixer

According to the invention, the reactants and water are mixed continuously with one another in a mixing apparatus comprising at least one mixer. This involves introducing streams of the reactants and water into the mixing apparatus, and a stream of the aqueous reaction mixture is obtained, which is polymerized in a downstream polymerization apparatus. It will be appreciated that it is possible to use a combination of a plurality of mixers. These may in principle be mixers with or without microstructures, provided that the process parameters specified below can thus be observed. The mixers may be operated separately from the reaction zone or may be part of the reaction zone.

"Conventional" mixers in the context of the present invention refer to mixers which do not possess microstructures—as defined below. Examples of suitable mixers without microstructures are both conventional dynamic mixers, for example mixing pumps and continuous flow stirred tanks, and mixing apparatus incorporated into pipelines, for example baffles, restrictors, jet mixers, T and Y pieces and static mixers.

Conventional mixers differ from mixers with microstructures by their characteristic dimension. The characteristic dimension of a flow device, for example of a mixer, is understood in the context of the present invention to mean the smallest extent at right angles to the flow direction. The characteristic dimension of a micromixer is significantly smaller than that of a conventional mixer and is typically in the micrometer to millimeter range.

Conventional mixers have a characteristic dimension within the range relevant for mixing of more than 10 mm, and mixers with microstructures, in contrast, of not more than 10 mm. The characteristic dimension of a mixer with microstructures used in accordance with the invention is preferably in the range from 1 μm to 10 000 μm, more preferably in the range from 10 μm to 5000 μm and especially in the range from 25 μm to 4000 μm. The optimal characteristic dimension is determined here from the requirements on the mixing quality and the proneness of the mixing apparatus to blockage. Mixers with microstructures are also referred to as micromixers.

Examples of suitable micromixers are:
I static mixers
  1. laminar diffusion mixers
    a) "chaotic-laminar" mixers, for example T mixers, Y mixers or cyclone mixers
    b) multilamination mixers or interdigital mixers
  2. laminar diffusion mixers with convective cross-mixing, for example shaped mixing channels or channels with secondary structures
  3. split-recombine mixers, for example caterpillar mixers
II dynamic mixers, for example mixing pumps
III combinations thereof, or
IV turbulent mixers,
  each of which satisfy the abovementioned conditions for the characteristic dimensions.

In a suitable embodiment, mixers with microstructures which have at least one mixing channel are used. The mixing may be laminar, laminar-chaotic or turbulent.

Micromixers preferred in accordance with the invention are explained in detail hereinafter.

In laminar diffusion mixers, substreams of the fluid which has been fanned out in a microstructure into a multitude of microscopically small flow lamellae with a thickness in the range from 10 to 2000 μm, especially 20 to 1000 μm and particularly 40 to 500 μm, are mixed exclusively by molecular diffusion at right angles to the main flow direction. The mixer can be designed via the Fourier number $Fo=\tau/\tau_D$, which is the ratio of residence time in the mixer to the diffusion time between the individual flow lamellae. For the diffusion time $T_D$, $$T_D = \frac{s^2}{D},$$

in which s is half the flow lamellae thickness [m] and D is the diffusion coefficient [m²/sec]. This ratio is generally selected to be greater than 1, preferably greater than 2, more preferably greater than 3 and especially greater than 4, in order to ensure very good molecular mixing of the streams at the outlet of the mixer.

Chaotic-laminar diffusion mixers may be configured as simple T or Y mixers, or as so-called multilamination mixers. In the case of the T or Y mixer, the two (or else more than two) substreams to be mixed are fed to a single channel through a T- or Y-shaped arrangement. The crucial factor for the transversal diffusion distance $S_{Diff}$ here is the channel width $\delta K$. Typical channel widths between 100 μm and 1 mm give rise to mixing times customary for liquids in the range from seconds to minutes. When, as in the present process, liquids are mixed, it is advantageous to promote the mixing operation additionally, for example by means of flow-induced transverse mixing.

In the case of multilamination mixers or interdigital mixers, the substreams to be mixed are divided in a distributor into a large number of microflow threads and, at the exit of the distributor, are then fed to the mixing zone alternately in lamellae. For liquids, mixing times in the range of seconds are achieved with the conventional multilamination mixers. Since this is insufficient for some applications (for example in the case of fast reactions), the basic principle has therefore been developed further by focusing the flow lamellae once again additionally by geometric or hydrodynamic means. The geometric focusing is achieved by a constriction in the mixing zone. The hydrodynamic focusing is achieved by two lateral streams which flow toward the main stream at right angles and thus further compress the flow lamellae. The focusing described allows lateral dimensions of the flow lamellae of a few micrometers to be achieved, such that even liquids can be mixed within a few 10 s of ms.

The laminar diffusion mixers with convective crossmixing used may be micromixers with structured walls. In the case of micromixers with structured walls, secondary structures (grooves or projections) are disposed on the channel walls. They are preferably arranged at a particular angle to the main flow direction, for example at an angle of about 30° up to 90°. In the case of inertia-dominated flow conditions, secondary vortices form as a result, which promote the mixing process.

In a further suitable embodiment, the mixer with microstructure used is a split-recombine mixer. Split-recombine mixers are notable for stages composed of recurrent separation and combination of streams. Two regions of an unmixed fluid stream (it is usual to start from two equally large lamellae) are each conducted away from one another in one stage, distributed into two new regions in each case, and combined again. All four regions are arranged alongside one another in alternation such that the original geometry is re-established. In each of these stages, the number of lamellae is thus doubled stage by stage, and lamella thickness and diffusion distance are thus halved.

Examples of suitable split-recombine mixers are the caterpillar mixer from IMM and the caterpillar mixer from BTS-Ehrfeld and the heat-exchanger mixers of Fluitec and Sulzer Examples of suitable dynamic micromixers are, for example, micro-mixing pumps.

Examples of preferred static micromixers are especially the following laminar diffusion mixers:
"chaotic-laminar" mixers, for example T or Y pieces with a very small capillary diameter in the range from 100 μm to 1500 μm and preferably 100 μm to 800 μm at the mixing point, and cyclone mixers;

multilamination mixers, for example the LH2 and LH25 slit plate mixers or larger types from Ehrfeld, and the SIMM and Starlam® interdigital mixers from IMM;

micromixers according to the multilamination principle with superimposed expanded flow, for example the SuperFocus Interdigital SFIMM microstructure mixer from IMM.

Turbulent mixers are based on the principle of turbulent mutual penetration of liquid jets. These may be free liquid jets which can be generated by compressing the liquid through suitable nozzles. The jets hit one another, which brings about the mixing. Such mixers are also known as "impinging jet micromixers". The principle may also be that conducted jets penetrate turbulently at the meeting point. Such a mixer consists of a plurality of plates which have fine channels and are arranged one top of another. For the mixing, a liquid stream is divided into many substreams by means of the channels and the liquid streams hit the liquid streams from plates above or below. This gives rise to strong microturbulences, which ensure rapid and good mixing. Details of such mixers are disclosed, for example, by WO 2005/018786 A1.

In the case of mixers with microstructures, it is advisable to provide filters upstream of the microstructured parts of the mixers in order to prevent blockages by particulate impurities, although this is not always absolutely necessary.

Reaction Zone

Figure 1:
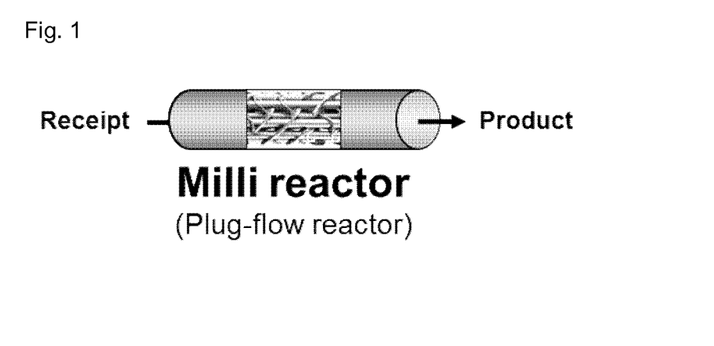
FIG. 1 shows a Milli reactor (a plug-flow reactor)
Figure 2:
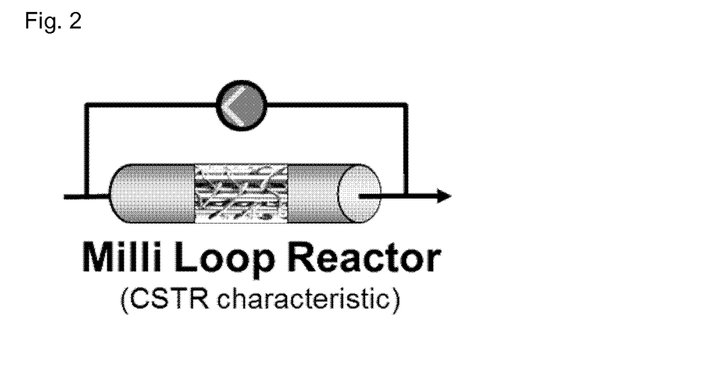
FIG. 2 shows a Milli loop reactor (CSTR characteristic)
FIG. 3 show a combined configurations of CSTR characteristic with downstream tubular reactor.
Figure 3:
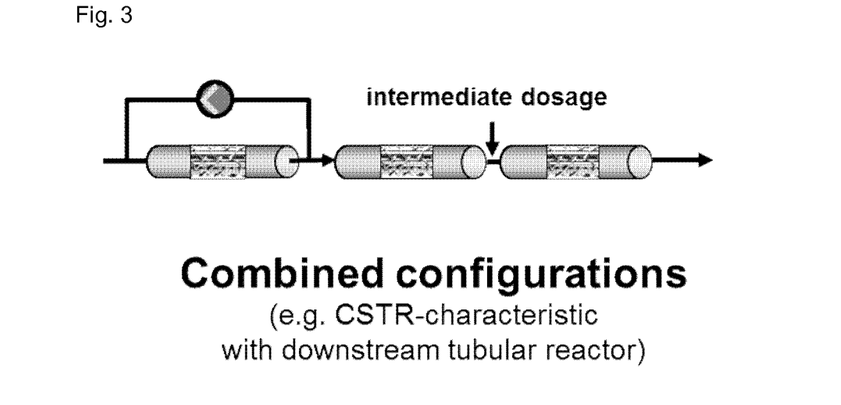

The reaction zone is made of tubular reactor with specific surface area larger than 50 m2/m3, preferably larger than 100 m2/m3. This can be achieved by using tubular reactors with diameter less than 80 mm or by using heat-exchanger mixer milli-reactors with diameters up to 300 mm. Such reactors are described for example in WO 2011/054789 A1 and EP 1067352B1. These reactors are modular as they are built of different segments. They can be run as 1) Plug flow reactor (FIG. 1)
2) Loop-reactor (FIG. 2)
3) Plug flow reactor with multiple feeds of monomers and/or initiator
4) Loop reactor with multiple feeds of monomers and/or initiator (FIG. 3)
5) Combination of the aforementioned modules The temperature of each module can be set individually. For example, increasing temperature profile, decreasing temperature profile. These reactors are run under pressure that is above the vapour pressure of the reaction mixture to assure hydraulically filled system.

Unlike traditional reactor like stirred tank reactor where heating or cooling could not be achieved so fast, properties of products manufactured with the inventive process can be better controlled. Also, due to the higher heat removal rate, temperature difference in the reaction medium is much smaller resulting in a more uniform product.

Preferably, the inventive continuous process for the manufacture of highly-branched homo- or copolymers of $C_3$-$C_8$ ethylenically unsaturated mono- or dicarboxylic acid in a tubular reactor is characterized by a rise in the space-time yield, in particular 2-50 times. Also the preparation of the inventive polymers consumes less space, because the tubular reactor is smaller than the processes run in semi-batch variations and there is no foaming issue as they can be run hydraulically filled. Hydraulically filled can be understood in the sense of the present invention that the reactor is completely filled with liquid and thus a gas phase is avoided. Since in the inventive process no gas phase occurs, no condensation of monomer can take place during the process. Therefore a homogenous mixture can be obtained in this continuous process. In addition to this, the temperature and the pressure can be raised in comparison to semi-batch processes.

In the sense of the present invention a stream can be understood as a compound in liquid form, whereby the compound is moved under force. This movement can be carried out, for example by a pump. The stream can also be a mixture of compounds, in particular with solvents.

In a further embodiment of the present invention, the tubular reactor segment is preferably filled with milli-structures.

In a preferred embodiment of the continuous process the polymerization takes place in at least two tubular reactor segments connected in series. The polymerization process according to the present invention can be carried out in various types of tubular reactor segments, for example of a different type or length. In one embodiment two tubular reactor segments are connected in series and one tubular reactor segment is connected in parallel to them.

Preferably in the tubular reactor segment the stream of the reaction mixture is held at a mean polymerization temperature which lies in the range of from 180° C. to 300° C., preferably 200-260° C., even more preferably 210-240° C.

In a preferred embodiment of the continuous process at least two tubular segments are connected in series, wherein the first tubular reactor segment has a first feed side and a first outlet side, wherein the first tubular reactor segment is connected to the second tubular reactor segment via the first outlet side that corresponds to the second feed side of the second tubular segment and whereby at least one recycle stream is removed from the outlet side of at least one tubular reactor segment and recycled to the inlet side of one of the tubular reactor segments. For example, tubular reactor segments can be connected in series, whereby one recycle stream is removed from the outlet side of the second tubular reactor segment and recycled to the feed side of the first or the second tubular reactor segment. In a further embodiment, two tubular reactor segments can be connected in series, whereby one recycle stream is removed from the outlet side of the first tubular reactor segment and recycled to the feed side of first tubular reactor segment. In the sense of the present invention one recycle stream can be understood as one loop.

In a preferred embodiment of the continuous process the ratio of the recycle stream to the feed stream is between 1 and 1000, preferably by weight. Preferably, the ratio is between 2 and 200, in particular between 3 and 100 and especially preferred between 10 and 50. The feed stream is the stream, where the recycle stream enters.

Preferably 90-100% of the total amount of monomer A is introduced in the first feed side, if desired 0-60% of the total amount of monomer B is introduced in the first feed side, whereby the remaining amount of the monomers A and optionally B is introduced after the first tubular reactor segment in at least one outlet or inlet side of a subsequent tubular reactor segment, and more preferably 100% of the total amount of monomer A is introduced in the first feed side and if desired 5-60% of the total amount of monomer B is introduced in the first feed side, whereby the remaining amount of monomers A and optionally B is introduced after the first tubular reactor segment in at least one outlet or inlet side of a subsequent tubular reactor segment.

Preferably, the temperature of the reactor fluid is reduced at the end of the reactor zone. The reduction of the temperature may be accomplished by cooling devices known in the state-of-the-art, e. g. heat exchangers, evaporation chambers, and the like.

Optionally, the reaction mixture may be subjected to one or more devolatilization steps. Any of the processes known in prior art may be used. In a preferred embodiment each degassing step is done via a flash apparatus consisting of at least an inlet zone, a flash tank, and an outlet zone.

The inlet zone consists of a pressure regulating device, for example a tube with reduced diameter and/or additional built-in components, a valve or other devices known in the art. The pressure regulating device may lead to a continuous and/or intermittent pressure drop. It may be identical to the pressure regulating device of the reaction zone.

The flash tank is operated under a pressure which is lower than the pressure inside the reaction zone. Preferred pressures range from low vacuum to 20 bar. When several devolatilization steps are employed, the operating pressures will decrease along the path of conveyance. Various types of pumps or valves may assist the generation and control of the pressure inside the flash tank. At least parts of the volatile components are transferred to the gas phase inside the apparatus. The gas phase is carried away via an outlet opening. The outlet opening is built in such a way that as little amount as possible of the product are transferred out of the apparatus. Usually the gas phase is partly condensed in a separate unit. The apparatus may additionally have a heating or cooling device.

Usually the reaction mixture is metered out of the apparatus via a pump in the lower zone of the apparatus.

Preferably the solvent is only partly removed by the degassing step.

The entire reactor system contains at least one pressure regulating device. Preferably it is used at the outlet zone of the reactor. It may be part of the inlet zone of a temperature-regulating step, e. g. a devolatilization step, but it may also be operated after a temperature reducing step, e. g. a heat exchanger. The pressure regulating device may be a valve, a tube with reduced diameter and/or additional built-in components, and the like.

The homo- or copolymer as defined above comprises the following compounds:

Monomer A

Monomer A is $C_3$-$C_8$ monoethylenically unsaturated mono- or dicarboxylic acid as well as the anhydrides and salts thereof. Suitable examples of monomer A include acrylic acid, methacrylic acid, crotonic acid, maleic acid, maleic anhydride, fumaric acid, itaconic acid and ammonium or alkali salts thereof. Monomer A is preferably acrylic acid (AA) or methacrylic acid. Most preferably, monomer A is acrylic acid.

Monomer B

Monomer B is at least one water-soluble, ethylenically unsaturated monomer. Water-soluble monomers have a solubility of at least 50 g/L, preferably 100 g/L in water. Suitable examples of monomer B include a phosphonic acid or phosphorous ester group like vinylphosphonic acid or esters of hydroxyethyl (meth)acrylate and (poly)phosphorous acid and their respective alkali and ammonium salts, sulfonic acid derivatives like vinylsulfonic acid, 2-acrylamido-2-methylpropanesulfonic acid (AMPS), 2-(meth)acryloxyethane sulfonic acid, 3-(meth)acryloxypropane sulfonic acid, vinylbenzene sulfonic acid, vinyl toluene sulfonic acid, allyl sulfonic acid or their respective salts, water-soluble (meth)acrylic acid derivatives, for example hydroxyethyl (meth)acrylate, 2- or 3-hydroxypropyl (meth)acrylate, hydroxybutyl acrylate, dimethyl- or diethylaminoethyl (meth)acrylate, and monomers derived by quaternization of these like 2-acryloyloxyethyl-trimethylammonium chloride, ester of monoethylenic unsaturated mono- or dicarbonic acids A with C2-C4-polyalkylenglykols, especially with those of polyethylenglykol or alkyl-polyethylenglykol, with a molar mass of the (alkyl)polyethylenglykole residue commonly in the range of 100 bis 3000 D, vinylformamide, water soluble (meth)acrylamides like (meth)acrylamide, N-methyl,-, N-ethyl- or N-isopropylacrylamide, diethyl- and dimethylaminoethyl or -aminopropyl(meth)acrylamide or their quaternized analogs, diallylamine, N,N-dimethyl-N,N-diallylammonium chloride, vinylimidazole and quaternized vinylimidazoles, N-vinyl pyrrolidone, N-vinyl caprolactame, N-vinyl-V-methylacetamide, acrylonitrile, vinylacetate, and the like.

Acrylic acid and any acidic comonomers can be used in the form of free acids or else in completely or partly neutralized form. Neutralisation may be preferentially done by alkali metal hydroxides or carbonates, ammonia and/or organic amines.

Polymerisation

Solvents

The free-radical polymerisation is performed in an aqueous medium.

The terms "aqueous solution" and "aqueous medium" in the context of this invention are intended to mean that the solvents used are essentially water. This does not rule out the presence of small amounts of other, water-miscible solvents. Further solvents may, for example, be alcohols such as methanol, ethanol or propanol. The proportion of water in the solvent mixture should, however, generally be at least 80% by weight, preferably at least 90% by weight and more preferably at least 95% by weight, based on the sum of all solvents together. Particular preference is given to using exclusively water as the solvent. However, this procedure does not rule out that small amounts of alcohols may nevertheless be present in the aqueous medium after the polymerization owing to side reactions.

According to the invention, in addition to monomer A, further water-soluble, monoethylenically unsaturated monomers (monomer B) may optionally be used for the synthesis of the polymers, the amount of monomer A being at least 50% by weight based on the sum of all monomers together, preferably at least 80% by weight, more preferably 95% by weight, and most preferably monomer A is exclusively used as the monomer.

The total monomer concentration in solution lies in the range of from 6 wt % to 90 wt %, preferably from 10 to 70 wt %, even more preferably from 12 to 50%.

Initiators

According to the invention, at least one water-soluble initiator or a water-soluble initiator system is additionally used. Useful for this purpose are in principle all water-soluble initiators which are known for the free-radical polymerization of ethylenically unsaturated monomers and can thermally initiate free-radical polymerization. Suitable water-soluble initiators are known in principle to the person skilled in the art, and are selected suitably according to the desired reaction conditions. Particular attention will be paid to selecting thermal initiators with an appropriate half-life at the desired polymerization temperature. It will be appreciated that it is also possible to use mixtures of different initiators.

The amount of initiator is typically 0.02 wt % to 10 wt %, preferably 0.04 wt % to 5 wt % and even more preferably 0.2 wt % to 4 wt %, based on the total amount of the monomers to be polymerized.

Suitable thermal initiators comprise especially initiators based on organic or inorganic peroxides, azo initiators or redox initiator systems. Specific examples of suitable polymerization initiators are specified below:

Peroxide compounds: These include, for example, organic peroxides and hydroperoxides such as acetyl peroxide, benzoyl peroxide, lauroyl peroxide, tert-butyl peroxyisobutyrate, caproyl peroxide, cumene hydroperoxide, di-tert-butyl peroxide, tert-butyl hydroperoxide, tert-amyl hydroperoxide, tert-butyl peroxyacetate, tert-butyl peroxybenzoate, tert-butyl peroxyoctoate, tert-butyl peroxyneodecanoate, tert-amyl peroxypivalate, tert-butyl peroxypivalate, diisopropyl peroxydicarbonate, dicyclohexyl peroxydicarbonate, dicumyl peroxide, dibenzoyl peroxide, dilauroyl peroxide; inorganic peroxides such as hydrogen peroxide, peroxodisulfuric acid and salts thereof, such as ammonium peroxodisulfate, sodium peroxodisulfate and potassium peroxodisulfate;

Azo compounds: These include, for example, 2,2'-azobis[2-(2-imidazolin-2-yl)propane] dihydrochloride, 2,2'-azobis[2-(2-imidazolin-2-yl)propane] disulfate dihydrate, 2,2'-azobis(2-methylpropionamidine) dihydrochloride, 2,2'-azobis[N-(2-carboxyethyl)-2-methylpropionamidine] hydrate, 2,2'-azobis{2-[1-(2-hydroxyethyl)-2-imidazolin-2-yl]propane} dihydrochloride, 2,2'-azobis[2-(2-imidazolin-2-yl) propane], 2,2'-azobis(1-imino-1-pyrrolidino-2-ethylpropane) dihydrochloride, 2,2'-azobis{2-methyl-N-[1,1-bis (hydroxymethyl)-2-hydroxyethyl]propionamide}, 2,2'-azobis[2-methyl-N-(2-hydroxyethyl)propionamide], 1-[(1-cyano-1-methylethyl)azo]formamide, dimethyl 2,2'-azobis (2-methylpropionate), 1,1'-azobis(cyclohexane-1-carbonitrile) or 4,4'-azobis(4-cyanopentanoic acid).

Redox initiators: This is understood to mean initiator systems which comprise an oxidizing agent, for example a salt of peroxodisulfuric acid, hydrogen peroxide or an organic peroxide such as tert-butyl hydroperoxide, and a reducing agent. As reducing agents, they preferably comprise a sulfur compound which is especially selected from sodium hydrogensulfite, sodium hydroxymethanesulfinate and the hydrogensulfite adduct onto acetone. Further suitable reducing agents are nitrogen and phosphorus compounds such as phosphorous acid, hypophosphites and phosphinates, di-tert-butyl hyponitrite and dicumyl hyponitrite, and also hydrazine or hydrazine hydrate. Further components include sugar derivatives like ascorbic acid, dextrose, and the like. Redox initiator systems may additionally comprise an addition of small amounts of redox metal salts such as iron salts, vanadium salts, copper salts, chromium salts or manganese salts, for example the ascorbic acid/iron (II) sulfate/sodium peroxodisulfate redox initiator system.

Particularly preferred for performance of the present invention are hydroperoxyides, especially hydrogen peroxide, t-butylhydroperoxide, t-amylhydroperoxide or cumoylhydroperoxide.

In another embodiment of the invention, the process may also be performed without any initiator. In such an instance it may be advisable to activate the monomer prior to use, for example by removing inhibitor by processes like distillation, adsorber column and the like.

Depending on the nature and amount of initiator system used the residence time in the reactor may be adjusted by adapting flow or volume of the reactor system.

The products of the invention may have molar masses Mw in the range 200 D to over 1.000.000 D, particularly 300-100.000 D, more particularly 500-25.000 D, even more particularly 600-12.500 D, and especially 700-8.000 D, determined by size exclusion chromatography.

The polymers obtainable by the continuous process of the present invention preferably have a degree of branching equal to or higher than 7 mol % related to the total amount of monomers, even more preferably equal to or higher than 8 mol %, especially preferred more than 10 mol %. In a special embodiment the polymers are synthesized in at least one circular loop reactor and have a degree of branching of at least 10 mol-%, especially preferred at least 13 mol %.

In a preferred embodiment of the invention, the polymerization is conducted in the absence of common chain transfer agents like mercaptanes, hypophophites, and the like. By appropriate choice of further components of the reaction mixture polymers may be obtained which contain sulfur and phosphorous atoms in less than 0.1%, preferably less than 100 ppm, most particularly less than 10 ppm, even less than 1 ppm. In a special embodiment, polymers are obtained which contain other heteroatoms besides hydrogen, carbon, oxygen, sodium or potassium in less than 1000 ppm, especially less than 100 ppm, most particularly less than 10 ppm, even less than 1 ppm. In a further special embodiment these polymers have molar masses Mw in the range 500 D-25.000 D, especially 600-12.500 D, more particularly 700-8.000 D.

The products of the invention may contain vinylic groups, as determined by 1H-NMR after dialyzing the product in water with a ZelluTrans/Roth V1,0 membrane with a permeation limit of Mw=1000 Da. The signals at δ=5.75 and 6.35 ppm and the rest of the polymer chain were integrated and processed through a system of linear equations to solve for the average molar ratio of unsaturation with respect to the amount of monomer units in the polymer. In a preferred embodiment, the average molar ratio of unsaturation is more than 0.1 mol %, especially more than 1 mol %, more preferably more than 2 mol %, even more preferably more than 3 mol % unsaturations with respect to the monomer units in the polymer.

The unsaturated polymers are still reactive towards polymerization and may be used, e. g. as crosslinkers in other polymerizations.

EXAMPLES

Polymer 1

The reactor is a 1 m long capillary tube made of hastelloy with an internal diameter of 4 mm and an outer diameter of 6 mm. This reactor was bent into a coil and immersed into the oil bath of a thermostat to heat/cool it to desired temperature.

In the following examples the temperatures were changed between 210-240° C. The monomer solution with 12.5 wt % in water and the initiator solution (1 wt % relative to the monomer) were metered by 2 HPLC pumps from the company Bischoff. These 2 streams were mixed with a micro-mixer from the company Swagelok for 2 s before they entered the reactor. The reactor was kept hydraulically filled by a pressure regulation valve that kept the pressure above the vapor pressure of the polymerizing solution (40 bars in the examples below).

Polymers 2 to 14 were manufactured according to the same process with the synthesis parameters disclosed in table 1.

The produced polymer was analyzed by size exclusion chromatography to determine its Mn, Mw and the ratio of Mw/Mn, D. SEC separation conditions were two TSK gel columns, 0.08 mol/l TRIS-buffer pH=7.0 in distilled water ion the presence of 0.15 mol/l NaCl and 0.01 mol/l NaN3 at 35° C. Calibration was done with narrowly distributed Na-polyacrylic acid standards of company PSS, Mainz, with molecular weights Mw=1.250 to Mw=1.100.000.

The degree of branching Cq of the obtained polymer was measured through 13C-NMR Spectroscopy of the free polyacrylic acid as described in Loiseau et al., Macromolecules 2003, 36, 3066-3077 and Couvreur et al. Macromolecules 2003, 36, 8260-8267.

TABLE 1

| Polymer | Residence Time [min] | T [° C.] | [AS] Wt % | [Initiator] % | [Initiator] | Mw [g/mol] | Degree of branching [mol %] |
|---|---|---|---|---|---|---|---|
| 1 | 2.5 | 220 | 12.5 | 1 | tBuOOH | 4897 | 9.1 |
| 2 | 7.5 | 220 | 12.5 | 1 | tBuOOH | 4460 | 10.5 |
| 3 | 2.5 | 240 | 12.5 | 1 | tBuOOH | 3601 | 7.7 |
| 4 | 7.5 | 240 | 12.5 | 1 | tBuOOH | 2807 | 8.1 |
| 5 | 1 | 210 | 12.5 | 1 | tBuOOH | 11113 | 8.8 |
| 6 | 1 | 220 | 12.5 | 1 | tBuOOH | 7463 | 9.2 |
| 7 | 1 | 240 | 12.5 | 1 | tBuOOH | 4758 | 10.1 |
| 8 | 2.1 | 210 | 24 | 5 | H2O2 | 18057 | 6.8 |
| 9 | 1.8 | 210 | 25.9 | 4 | tBuOOH | 1326 | 8.3 |
| 10 | 1.8 | 210 | 25.1 | 1 | tBuOOH | 11959 | 9.2 |
| 11 | 1.4 | 210 | 25 | 10 | H2O2 | 7052 | 5.5 |
| 12 | 1.4 | 210 | 12.5 | 2 | tBuOOH | 13864 | 7.1 |
| 13 | 1.2 | 210 | 11.2 | 1 | tBuOOH | 12170 | 9.1 |
| 14 | 2.5 | 210 | 12.5 | 1 | tBuOOH | 6397 | 10.4 |
| 15 | 7.5 | 210 | 12.5 | 1 | tBuOOH | 5982 | 10.5 |
| 16 | 7.5 | 210 | 25 | 1 | tBuOOH | 20199 | 8.8 |
| 17 | 7.5 | 210 | 25 | 4 | tBuOOH | 13019 | 7.4 |
| 18 | 7.5 | 210 | 35 | 1 | tBuOOH | 23875 | 7.8 |
| 19 | 7.5 | 210 | 35 | 4 | tBuOOH | 16785 | 7.2 |
| 20 | 7.5 | 210 | 12.5 | 4 | tBuOOH | 6267 | 10.1 |

Initiator:
tBuOOH: tert-butyl hydroperoxide
H2O2: Hydrogen Peroxide

TABELLE 2

| Polymer | Rxn. Time [min] | T [° C.] | [AS] Wt % | [Init.] % | Mn [g/mol] | Mw [g/mol] | D |
|---|---|---|---|---|---|---|---|
| 21 | 10 | 220 | 12.5 | 4 | 660 | 3967 | 6 |
| 22 | 1 | 240 | 25 | 0.2 | 1'839 | 14196 | 7.7 |
| 23 | 1 | 240 | 50 | 0.2 | 1'452 | 10678 | 7.4 |
| 24 | 1 | 210 | 60 | 0.5 | 3'003 | 43130 | 14.4 |
| 25 | 2.5 | 210 | 6 [NaAcrylate] | 1 | 678 | 2714 | 4 |
| 26 | 1.4 | 210 | 26 | 2 | | 3680 | |
| 27 | 7.6 | 210 | 25 | 1 | | 5340 | |

Acrylic acid could be replaced by methacrylic acid in additional trials.

Example 28

An aqueous solution of acrylic acid (33.5 w-%) was fed via a static micromixer into a circular loop reactor of 18.5 ml volume at a rate of 32.8 g/h. In parallel, an aqueous solution of tert-butylhydroperoxide (5 w-%) was fed via the same micromixer to the reactor at a rate of 13.2 g/h. The circular loop was operated at a rate of 9 l/h and at a temperature of 210° C. The residence time in the reactor was about 10 mins. The effluent from the circular loop reactor was conveyed through a tubular reactor zone immersed into a cooling bath followed by a pressure valve. The resulting polymer had a molar mass Mw of 5950 D, a polydispersity of 3.6 and a degree of branching of 20.9 mol-%.

The experiment of example 28 was repeated under different conditions shown in Table 3:

| Polymer | Rxn. Time [min] | T [° C.] | [AS] Wt % | [Init.] % | | Mw [g/mol] | Degree of branching [mol %] |
|---|---|---|---|---|---|---|---|
| 29 | 7.5 | 210 | 12.5 | 1 | tBuOOH | 3.330 | 15.7 |
| 30 | 7.5 | 210 | 12.5 | 2 | tBuOOH | 3.929 | 16.9 |
| 31 | 7.5 | 210 | 35.5 | 4 | tBuOOH | 6.406 | 20.7 |
| 32 | 7.5 | 220 | 12.5 | 1 | tBuOOH | 1.864 | 15.7 |
| 33 | 7.5 | 240 | 12.5 | 1 | tBuOOH | 1.308 | 13.3 |
| 34 | 7.5 | 210 | 25 | 1 | tBuOOH | Nd | 17.2 |
| 35 | 7.5 | 210 | 35 | 1 | tBuOOH | Nd | 18.2 |
| 36 | 5 | 210 | 12.5 | 1 | H2O2 | 6.714 | 13.9 |
| 37 | 20 | 210 | 12.5 | 1 | tBuOOH | 2.039 | 17.7 |
| 38 | 15 | 210 | 12.5 | 1 | tBuOOH | 2.005 | 16.3 |
| 39 | 7.5 | 220 | 35 | 4 | H2O2 | 3.344 | 19.7 |
| 40 | 10 | 210 | 30 | 2 | tBuOOH | 6.832 | 22.5 |

Nd: not determined

The degree of unsaturation was determined for several polymers.

| Polymer | Degree of unsaturation [mol %] |
|---|---|
| 5 | 1.1 |
| 29 | 3.9 |
| 31 | 1.9 |
| 32 | 4.8 |
| 33 | 6.3 |
| 39 | 2.7 |

Use of the Polymers as Crosslinking Agents

Example 41

To a solution of 2 g of sodium lauryl sulfate in 450 g water was added an emulsion of 147 g water, 2 g sodium lauryl sulfate, 11 g polyoxyethylen(20)-sorbitan-monooleate, 280 g methacryl amide, 206 g ethyl acrylate, 2 g stearyl-polyoxethylen(25) methacrylate, 172 g methacrylic acid and 0.3 g of polymer 28 under stirring at 75° C. over a period of 2.5 h. In parallel, a solution of 1 g of sodium peroxidisulfate in 136 g water was fed over 3 h to the reactor. The sample was further polymerized for 4 h at 75° C. in the presence of 1 g sodium peroxidisulfate in 29 g of water.

A gel was prepared with 4 wt-% of the polymer of Example A, 1.5 wt-% 2-amino-2-methyl-1-propanol, and water. The Brookfield viscosity (spindle 6, 20 rpm, 20° C.) was 28.200 mPas.

The gel was smooth and well spreadable.

Example 42

Example 41 was repeated using 1.5 g of polymer 28
The Brookfield viscosity of the corresponding gel was 30.400 mPas.

The gel was smooth and well spreadable.

Comparative Example 1

Example A was repeated using no crosslinking component polymer 28.

The Brookfield viscosity of the corresponding gel was 8.300 mPas.

The gel was mucilaginously and turned stringy when spreadable.

The tests show the crosslinking effect of polyacrylic acids of the invention.

Solubility of the Polymers

A solution of 13.5 wt.-% a linear alkylbenzenesulfonic acid, 4 wt.-% of a C12-C16 fatty acid, 6 wt.-% KOH, 11 wt.-% C13-15 alcohol ethoxylated with 7 ethylene oxide units, 6 wt.-% propylene glycol and 2 wt.-% ethanol in water was prepared. To this solution 1 wt.-% of polymer and water (to 100 wt.-%) were added. The system was stirred thoroughly and permitted to rest for 24 h.

Example 4 is a polymer solution of polymer N° 4, adjusted with NaOH to pH 8. PAA 1 is a polyacrylic acid sodium salt solution in water with molar mass 1200 D and a degree of branching <5 mol %, a solid content of 45 wt.-% and a pH of 8. PAA 2 is a polyacrylic acid sodium salt solution in water with molar mass 4000 D, a degree of branching <5 mol %, a solid content of 45 wt.-% and a pH of 8.

| Polymer | Appearance |
|---|---|
| none | clear |
| Example 4 | clear |
| PAA 1 | hazy |
| PAA 2 | hazy, partly precipitated |

The test shows that the branched polyacrylic acids of the invention have a better compatibility in solvents.

The invention claimed is:

1. A continuous process for the manufacture of homopolymers or copolymers by free-radical polymerization of monomer A, $C_3$-$C_8$ monoethylenically unsaturated mono- or dicarboxylic acid or of the anhydrides and salts thereof, and optionally, monomer B, water-soluble, ethylenically unsaturated monomers different from monomer A in an aqueous medium in the presence of at least one water-soluble initiator, the process comprises the following steps:
   i) optionally, continuously metering the solutions of the monomer A, and the optional monomer B, and a solution of the initiator into a mixing unit comprising at least one micro-mixer and mixing the reactants in the mixing unit,
   ii) conducting continuous free-radical polymerization in at least one tubular reactor segment at a temperature of from 180° C. to 300° C., wherein the tubular reactor has a specific surface area larger than 50 $m^2/m^3$, and the entire reactor system contains at least one pressure regulating device.

2. The continuous process according to claim 1, wherein the polymerization is conducted in the absence of common chain transfer agents.

3. The continuous process according to claim 1, wherein the ratio of the length of at least one tubular reactor segment in the direction of the flow of the stream to the diameter is from 1000:1 to 10:1.

4. The continuous process according to claim 1, wherein the polymerisation is carried out at a temperature of 200° C. to 260° C.

5. The continuous process according to claim 1, wherein the polymerisation is carried out at a temperature of 210° C. to 240° C.

6. The continuous process according to claim 1, wherein the free-radical polymerization is carried out in at least two tubular reactor segments connected in series.

7. The continuous process according to claim 6, wherein the first tubular reactor segment has a first feed side and a first outlet side, wherein the first tubular reactor segment is connected to the second tubular reactor segment via the first outlet side that corresponds to the second feed side of the second tubular segment and whereby at least one recycle stream is removed from the outlet side of at least one tubular reactor segment and recycled to the inlet side of one of the tubular reactor segments.

8. The continuous process according to claim 1, wherein at least one tubular reactor segment is a tubular reactor filled with milli-structured filling.

9. The continuous process according to claim 7, wherein the ratio of the recycle stream to the feed stream is between 1 and 1000.

10. The continuous process according to claim 7, wherein
90-100% of the total amount of monomer A is introduced in the first feed side,
0-60% of the total amount of monomer B is introduced in the first feed side,
and the remaining amount of the monomers A, and optionally B, is introduced after the first tubular reactor segment in at least one outlet or inlet side of a subsequent tubular reactor segment.

11. The continuous process according to claim 1, further comprising the step of subjecting the reaction mixture following the polymerisation to at least one degassing step carried out in a flash apparatus including at least an inlet zone, a flash tank and an outlet zone.

12. The continuous process according to claim 1, wherein monomer A is selected from the group consisting of acrylic acid, methacrylic acid, crotonic acid, maleic acid, maleic anhydride, fumaric acid, itaconic acid, the ammonium or alkali salts thereof and mixtures thereof.

13. The continuous process according to claim 1, wherein monomer A is acrylic acid.

14. A polymer prepared by the continuous process according to claim 1, wherein the polymer has a degree of branching equal to or higher than 7 mol % related to the total amount of monomers.

15. The polymer according to claim 14, wherein the polymer has a sulphur content of less than 1000 ppm, and a phosphorous content of less than 1000 ppm.

16. The polymer according to claim 14, wherein the polymer has an average degree of unsaturation of more than one unit per molecule.

17. A crosslinking component prepared by the continuous process according to claim 1, wherein the polymer has a degree of branching equal to or higher than 7 mol % related to the total amount of monomers.

* * * * *